United States Patent
Weirauch

(10) Patent No.: US 6,845,072 B1
(45) Date of Patent: Jan. 18, 2005

(54) DVD DEFECT MANAGEMENT SCHEME THAT IS TRANSPARENT TO DVD VIDEO PLAYERS

(75) Inventor: Charles R Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 09/286,413

(22) Filed: Apr. 5, 1999

(51) Int. Cl.[7] .................................................. G11B 7/00
(52) U.S. Cl. .............................. 369/53.15; 369/59.25
(58) Field of Search ........................... 369/275.3, 47.32, 369/47.33, 47.34, 53.15, 53.2, 59.25, 53.35, 47.14

(56) References Cited

U.S. PATENT DOCUMENTS

| | | | | |
|---|---|---|---|---|
| 4,796,113 A | * | 1/1989 | Hayakawa | 369/54 |
| 5,255,270 A | * | 10/1993 | Yanai et al. | 360/53 |
| 5,258,852 A | * | 11/1993 | Kamijima | 369/53 |
| 5,532,992 A | * | 7/1996 | Funamoto | 369/47 |
| 5,541,903 A | * | 7/1996 | Funahashi et al. | 369/54 |
| 5,745,444 A | * | 4/1998 | Ichikawa et al. | 369/32 |
| 5,914,928 A | * | 6/1999 | Takahashi | 369/58 |
| 6,034,831 A | * | 3/2000 | Dobbek et al. | 360/53 |
| 6,160,778 A | * | 12/2000 | Ito et al. | 369/275.3 |
| 6,175,549 B1 | * | 1/2001 | Takagi et al. | 369/275.3 |

* cited by examiner

*Primary Examiner*—Nabil Hindi
(74) *Attorney, Agent, or Firm*—Augustus W. Winfielf

(57) ABSTRACT

An optical disc has a user data area that is a single contiguous zone, so that video and audio data can be continuous, and has replacement areas for computer data that are outside the user data areas. Placing the replacement areas outside the user-data area enables a video player to read a disc containing defect management written by a computer drive. For video and audio data, defective sectors are used anyway, and errors may or may not be corrected in real time. For computer data, logical addresses of defective blocks are remapped to a replacement area, but this mapping is independent of what is physically written in the user-data area. The replacement area is preferably in the lead-in and/or lead-out areas of the disc.

4 Claims, 3 Drawing Sheets

DVD DEFECT MANAGEMENT SCHEME THAT IS TRANSPARENT TO DVD VIDEO PLAYERS

FIELD OF INVENTION

This invention relates generally to digital data storage and more specifically to defect management on optical disks.

BACKGROUND OF THE INVENTION

Some data storage media may be used in both computers and in consumer devices such as video or audio players. However, for some media types, formats for consumer applications and formats for computer applications may be incompatible. For example, the term DVD (also referred to as digital versatile disc, or digital video disk) describes a physical medium having a standard size, but there are many proposed logical formats for use in recording video data, audio data, and computer data, some of which are incompatible. One particular requirement leading to format incompatibility is the requirement for defect management.

Recording of digital data, particularly on rewriteable media, is rarely defect free. Typically, data storage is broken into addressable units, and each addressable unit may include overhead data for error detection. It is also common to combine addressable units into larger blocks for error correction. Finally, for computer data, where data integrity is essential, it is common to reserve areas of a data storage medium for replacements, wherein if an addressable unit or block is unusable, a replacement addressable unit or block may be used instead. During reading of computer data, if a drive detects a unit or block that has been marked as defective, the drive determines where the replacement is stored (the logical address is mapped to a different physical address), and reads the replacement. Typically, some delay time (called latency) is required to access the replacement. Another form of defect management can exist within a host computer, specifically within a file system. However, video and audio players typically do not interact with a host computer file system, and this type of defect management is not relevant to the present application.

Replacement blocks are typically not used for digital video or digital audio data. First, digital video and digital audio is often recorded on stamped media, where defects are inherently fewer than for write-once or rewriteable media. Second, digital video or digital audio is relatively tolerant of data errors so that there is typically no need for replacements. For example, a single uncorrected error in video data might cause a visual defect or loss of synchronization that lasts at most for a few milliseconds. The human perception system (sight, sound, and touch) tends to integrate, filter, and interpolate discontinuities so that many defects are not perceived, or are acceptable. In addition, many video and audio players may filter or otherwise compensate for discontinuities. Third, video and audio applications require a continuous stream of data, and the latency required to skip a defective data unit and to read a replacement data unit may be unacceptable. In particular, if replacement areas are interleaved with the data areas, a replacement area then causes a relatively long discontinuity in the video or audio data stream as the drive seeks around each replacement area.

It would be useful if a drive could write a DVD medium using one format that could be used universally for digital computer data, digital video data, and digital audio data. Defect management, in particular replacement, is required for DVD computer data, and replacement is incompatible with present DVD video players. There are proposals for defect management that require a new video drive design that can accommodate replacement. There is a need for DVD defect management that is compatible with present DVD video players.

SUMMARY OF THE INVENTION

An optical disc has a user-data area that is a single contiguous zone, so that video and audio data can be continuous, and has replacement areas for computer data that are outside the user-data area. Placing the replacement areas outside the user-data area enables a video player to read a disc containing defect management written by a computer drive. For video and audio data, defective sectors are used anyway, and errors may or may not be corrected in real time. For computer data, logical addresses of defective blocks are remapped to a replacement area, but this mapping is independent of what is physically written in the user-data area. The replacement area is preferably in the lead-in and/or lead-out areas of the disc.

DETAILED DESCRIPTION OF THE PREFERRED EMBODIMENT OF THE INVENTION

Figure 1:
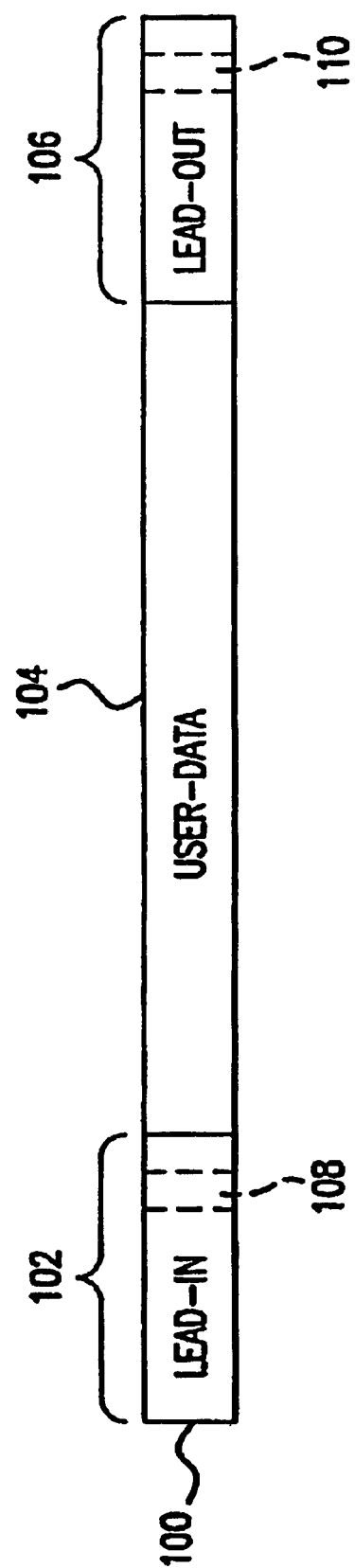
FIG. 1 is a block diagram of a data track for a digital disc, with replacement areas in the lead-in and lead-out areas in accordance with the invention.

FIG. 1 illustrates a data track 100 for a DVD disc. Most proposed DVD formats specify a spiral track that begins near the center of the disc, and the track spirals outward toward the perimeter of the disc. Some proposed DVD formats have track arrangements that are not a single continuous spiral. However, existing DVD video discs have a single spiral track, and a goal of the invention is to have a format that is compatible with existing DVD video players. DVD formats, like earlier Compact Disc (CD) formats, on any given layer, specify an area at the beginning of the track called a lead-in area 102. The lead-in area does not contain user data, but instead is used for various overhead data, such as various identification numbers, and a directory of the information that is recorded within the user area. The lead-in area is followed by a user-data area 104. Finally, the user-data area is followed by a lead-out area 106. The lead-out area is at least partially a redundant copy of the lead-in area for protection in case part of the lead-in area becomes defective.

In the present invention, at least one replacement area (108, 110) for defective areas in the user-data area 104, is placed in the lead-in area (102), or the lead-out area (106), or both. It is not necessary to have a redundant copy of a replacement area. For purposes of the present invention, it is only important that a replacement area is not within the user-data area 104.

The definition of defective may vary among various drive manufacturers. In particular, a drive may declare an area defective if the number of errors after a onetime write for a block exceeds a fixed predetermined threshold. In some situations, an area of a rewriteable disc may become worse after multiple writes. Therefore, a conservative criteria may designate areas as defective, even though the errors may be correctable using error correction overhead data.

Figure 2:
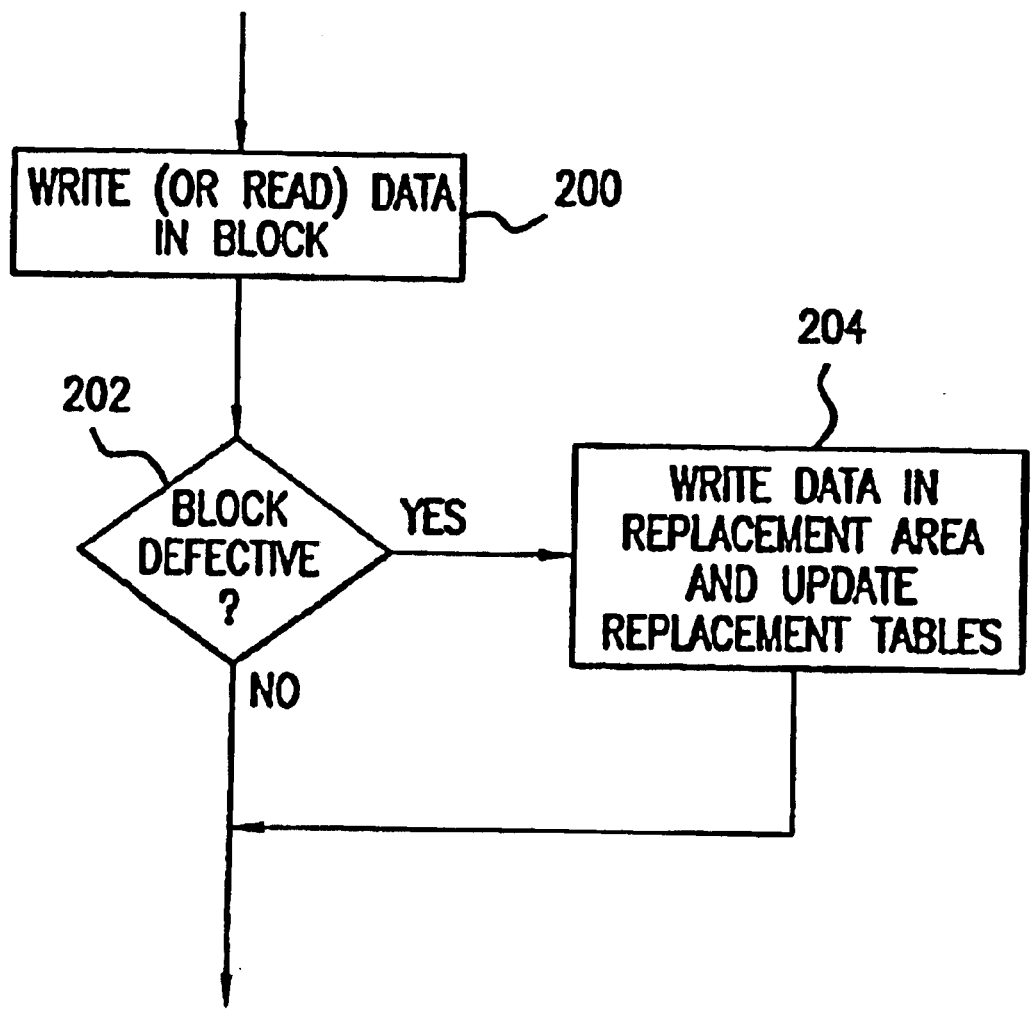
FIG. 2 is a flow chart of a first example method in accordance with the invention.

FIG. 2 is a first example method of writing data in accordance with the invention. FIG. 2 is applicable, for example, for a writeable DVD drive in a computer, that may write a disc for use in a video player, or may write a disc for computer data. In the method of FIG. 2, the drive makes no distinction between video data and computer data; each are written exactly the same way. In FIG. 2, at step 200, data is written into a block in the user area. If the block in the user area is defective (decision 202), the data is also written into a replacement area and replacement tables are updated (step 204). If the block is defective, the logical address of the defective block is remapped to the replacement area. However, remapping of logical addresses is transparent to what is physically written into the user-data area.

Figure 3:
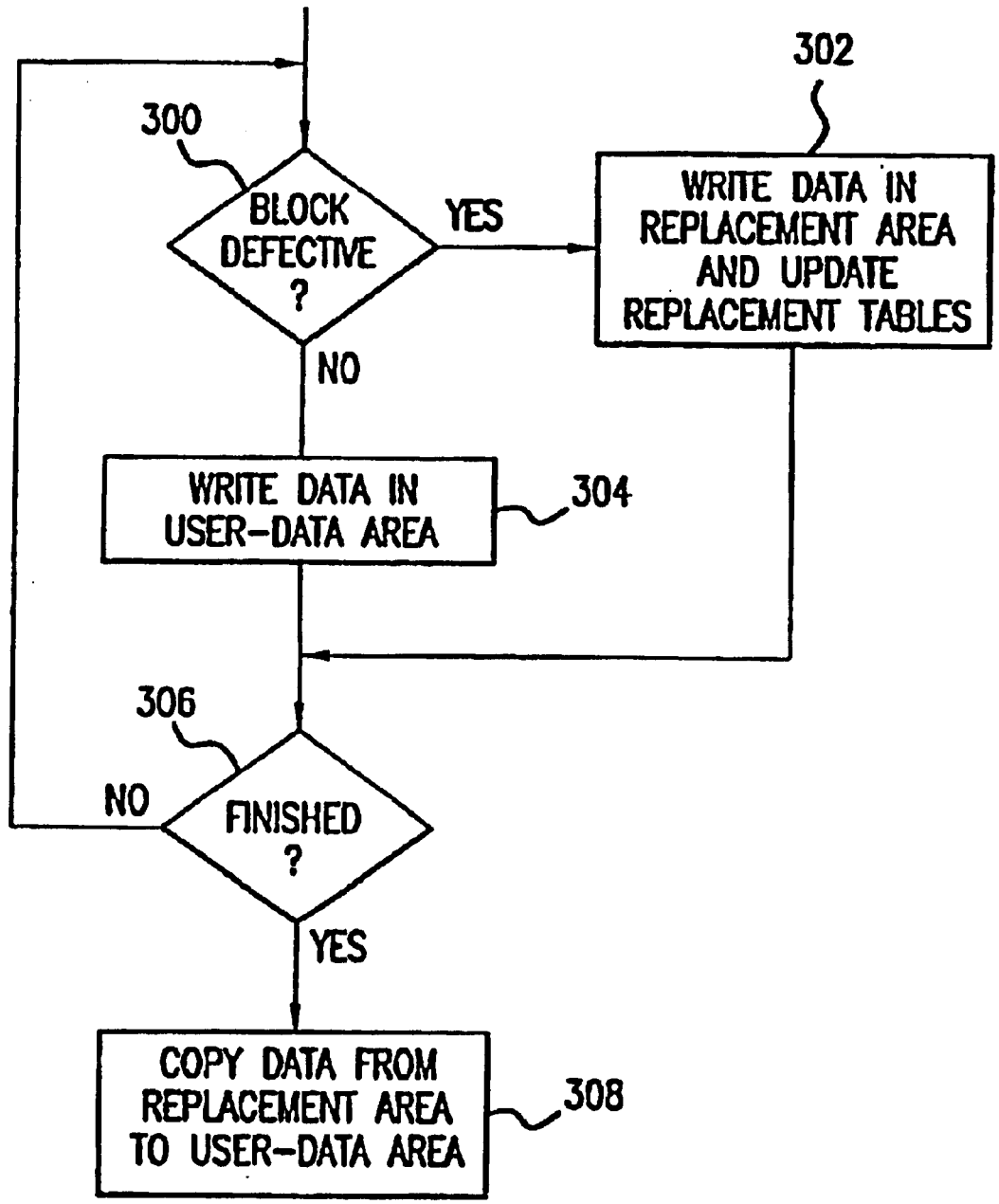
FIG. 3 is a flow chart of a second example method in accordance with the invention.

FIG. 3 is a second example method of writing data in accordance with the invention. Consider, for example, a situation in which a video disc is being written by a drive in a computer. The file (or files) may be edited, and re-edited many times, and then a final version may be written. Since some defective areas may deteriorate after multiple writes, it is preferable to minimize writing to known defective areas. Accordingly, in the method of FIG. 3, if a block in the user-data area is defective (step 300), the data is first written only into a replacement area and replacement tables are updated (step 302). Otherwise, if the block in the user-data area is OK, the data is written into the user-data area (step 304). This process is repeated until the final version of the file is complete (decision 306). Once the final version of the file is complete, then data is copied once from the replacement area to the user-data area (step 308).

For either method, the end result is a disc that can be written in one standard way, whether for computer data, video data, or audio data, and can be read by existing video players. There are no video or audio discontinuities from interleaved replacement blocks. Computers reading the resulting disc can utilize replacement blocks for error-free data, whether the data is computer data, video data, or audio data.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for recording data on an optical disc, the method comprising the following steps:

writing data in a user-data area of the optical disc;

encountering a defective area;

writing data intended for the defective area in a replacement area; and copying, the data from the replacement area to the defective area to form contiguous data in the user-data area.

2. A method for recording data on an optical disc, the method comprising the following steps:

writing data in a user-data area of the optical disc;

encountering an area that is known to be defective;

writing data intended for the area that is known to be defective, in a replacement area, the replacement area outside the user-data area; and writing the data intended for the area that is known to be defective, in the area that is known to be defective, in addition to the replacement area, to form contiguous data in the user-data area.

3. A method for recording data on an optical disc, comprising:

writing data contiguously in a user-data area of the optical disc, including portions of the user-data area that are defective, so that the resulting recorded data can be read contiguously in at least one of a video player and an audio player; and writing data that is written into portions of the user-data area that are defective also in a replacement area; and mapping, to the replacement area, the data that is written into portions of the disc that are defective.

4. An optical disc medium, comprising:

a user-data area that is contiguous, and an area for replacement data that is outside the user-data area;

contiguous data in the user-data area, including portions of the user-data area that are defective, so that the resulting data can be read contiguously in at least one of a video player and an audio player; and a copy, in the replacement area, of data that is written into portions of the user-data area that are defective.

* * * * *